(12) United States Patent
Kajouke et al.

(10) Patent No.: US 7,483,282 B2
(45) Date of Patent: Jan. 27, 2009

(54) PWM METHOD FOR CYCLOCONVERTER

(75) Inventors: Lateef A. Kajouke, San Pedro, CA (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 282 days.

(21) Appl. No.: 11/468,001

(22) Filed: Aug. 29, 2006

(65) Prior Publication Data

US 2008/0055938 A1     Mar. 6, 2008

(51) Int. Cl.
*H02M 7/48* (2007.01)
*H02M 5/00* (2006.01)

(52) U.S. Cl. ............................. 363/149; 363/159; 363/8
(58) Field of Classification Search ................. 363/149, 363/159, 8
See application file for complete search history.

(56) References Cited

U.S. PATENT DOCUMENTS

| | | | | |
|---|---|---|---|---|
| 5,159,539 A | * | 10/1992 | Koyama | .......................... 363/8 |
| 5,285,365 A | * | 2/1994 | Yamato et al. | ................. 363/8 |
| 6,351,397 B1 | * | 2/2002 | Sawa et al. | .................... 363/50 |
| 7,372,709 B2 | * | 5/2008 | Mazumder et al. | ............ 363/16 |

* cited by examiner

*Primary Examiner*—Shawn Riley

(57) ABSTRACT

A method of using a cycloconverter switches a first switch of the first topology type to an on state after a magnitude of a current through an output inductor becomes less than a predetermined current threshold, and switches a second switch of the first topology type to an off state a first time after switching the first switch to the on state. The cycloconverter includes nodes on a first port, nodes on a second port, a switch pair coupled between a first node of the first port and a first node of the second port, a switch pair coupled between a second node of the first port and a first node of the second port, a switch pair coupled between a first node of the first port and a second node of the second port, and a switch pair coupled between a second node of the first port and a second node of the second port. Each switch pair includes a switch of each topology type.

34 Claims, 12 Drawing Sheets

S5 — SWITCH A FIRST N TOPOLOGY SWITCH TO AN ON STATE AFTER A MAGNITUDE OF A CURRENT THROUGH AN OUTPUT INDUCTOR BECOMES LESS THAN A PREDETERMINED THRESHOLD

S6 — SWITCH A SECOND N TOPOLOGY SWITCH TO AN OFF STATE A FIRST PREDETERMINED TIME AFTER TURNING THE FIRST N TOPOLOGY SWITCH TO THE ON STATE

S7 — SWITCH A FIRST P TOPOLOGY SWITCH TO AN ON STATE A SECOND PREDETERMINED TIME AFTER TURNING THE SECOND N TOPOLOGY SWITCH TO THE OFF STATE

S8 — SWITCH A SECOND P TOPOLOGY SWITCH TO AN OFF STATE A THIRD PREDETERMINED TIME AFTER TURNING THE FIRST P TOPOLOGY SWITCH TO THE ON STATE

FIG. 12

PWM METHOD FOR CYCLOCONVERTER

BACKGROUND OF THE INVENTION

1. Field of the Invention

The present invention relates to electric vehicles and hybrid electric vehicles. In particular, the invention relates to auxiliary power systems used by such vehicles to supply auxiliary power.

2. Description of Related Art

The assignee of the present invention designs and develops electric and hybrid-electric vehicles and power systems for use therein. Prior art related to power systems include a description of auxiliary power systems where the main power system for traction drive is tapped to provide auxiliary power for other purposes. The auxiliary power system may be used to provide electric power for other electric appliances that are normally built in, or come with, the vehicle, such as a radio, headlights, air conditioning blowers, etc. At other times, the auxiliary electric power system may be called upon to provide electric power for electric appliances that are frequently "plugged" into the vehicle, such as a cigarette lighter and power packs for recharging cell phones, laptop computers, and other devices that typically plug into the cigarette lighter socket. At still other times, the auxiliary electric power system may be called upon to provide 110 V ac or dc electric power for electric appliances normally unassociated with the vehicle, for example, an electric shaver or an electric tool such as an electric power saw, an electric power drill, an electric power grinder or a variety of electric appliances for use when the vehicle is used for camping or fishing.

FIG. 1 depicts an auxiliary power system that includes a dc power source, a high frequency inverter 3, a high frequency transformer 5 and a cyclo-converter 7 connected to a load. Switches within high frequency inverter 3 and cyclo-converter 7 are controlled by controller 1. The different ways in which these switches are controlled differentiates a known system from an embodiment of the present invention.

FIG. 2 depicts the high frequency inverter 3 (HF inverter 3), coupled between the dc voltage (V_DC) from the dc power source and the high frequency transformer 5 (HF transformer 5). The HF inverter includes four switches S1, S2, S3, S4. Switch S1 includes a bypass diode 30 and a corresponding active switch element 20. Similarly, switches S2, S3, S4 include bypass diodes 32, 34, 36 and corresponding active switch elements 22, 24, 26.

Active switch element 20 of switch 81 is capable of either conducting current from V_DC (+) to the HF transformer or blocking current conduction depending on a control signal applied to active switch element 20. Bypass diode 30 is capable of conducting current from the HF transformer toward V_DC (+), but not the other way. Similarly, active switch element 24 of switch S3 is capable of selectively conducting current or blocking current conduction from V_DC (+) to the HF transformer. Bypass diode 34 is capable of conducting current from the HF transformer toward V_DC (+), but not the other way.

Active switch element 22 of switch S2 is capable of either conducting current from the HF transformer to V_DC (−) or blocking current conduction depending on a control signal applied to active switch element 22. Bypass diode 32 is capable of conducting current from V_DC (−) toward the HF transformer, but not the other way. Similarly, active switch element 26 of switch S4 is capable of selectively conducting current or blocking current conduction from the HF transformer to V_DC (−). Bypass diode 36 is capable of conducting current from V_DC (−) toward the HF transformer, but not the other way. The active switch elements 20, 22, 24, 26 typically include an insulate gate bipolar transistor (IGBT). Although other switch technologies may be used.

In operation, the switching frequency of the HF inverter is selected between 3,000 and 30,000 Hz. The HF inverter converts the dc supply voltage V_DC into square wave voltage pulses that pass through HF transformer 5 to be applied between the A_BUS (i.e., connected to terminal A) and B_BUS (i.e., connected to terminal B) of cyclo-converter 7.

FIG. 3 shows the HF transformer 5 and cyclo-converter 7. Cyclo-converter 7 includes four switch pairs AU, BU, AV and BV, arranged in a bridge configuration. Transformer 5 is coupled to the bridge by A_BUS and B_BUS (the A and B terminals of the bridge). A load side filter includes inductor L. Hall effect sensor H and capacitor C. The load side filter is coupled to the bridge between nodes U and V.

Each switch pair includes two switches: a P topology switch and an N topology switch. The last letter of the three letter designation of the switch indicates whether the switch is a P topology switch or an N topology switch, P topology switches are those switches that are in an on state in order to allow the current through inductor L to now from the node U to the node V The current direction from the node U to the node V is considered positive. (Thus the term P topology).

N topology switches are those switches that are in an on state in order to allow the current through inductor L to flow from the node V to the node U. According to the adopted convention, the current direction from V to U is considered negative. (Thus the term N topology)

Switch pair AU is connected to the A_BUS and includes switches AUP and AUN. Switch pair AV is also connected to the A_BUS and includes switches AVP and AVN. Switch pair BU is connected to B_BUS and includes switches BUP and BUN. Switch pair BV is also connected to B_BUS and includes switches BVP and BVN.

Controller 1 controls the two switch elements of each switch pair to create potentially four operation states. Switch pair AU will be used as an example. AU is OFF is when current cannot flow from the A_BUS through switch pair AU to inductor L in either direction. In the OFF state, both switch elements block current flow, and the two diodes are connected in a back-to-back configuration to block current flow in either direction. In the ON state, both switch elements are conducive so that current can flow in both directions through switch pair AU.

In a third state, the switch element of switch AUP is on to permit conduction from the A_BUS, around the diode of switch AUP, through the diode of switch AUN to node U. The switch element of switch AUN is off to block current flow from node U to switch AUP, and thus the diode of switch AUN cannot be bypassed. Current flow is blocked by both the diode and the switch element of switch AUN so that current from node U is blocked from flowing through switch AUN through switch AUP to the A_BUS.

In a fourth state, the switch element of switch AUN is on to permit conduction from node U, around the diode of switch AUN, through the diode of switch AUP to the A_BUS. The switch element of switch AUP is off to block current flow from the A_BUS to switch AUN, and thus, the diode of switch AUP cannot be bypassed. Current flow is blocked by both the diode and the switch element of switch AUP so that current from the A_BUS is blocked from flowing through switch AUP through switch AUN to node U.

Each of the other switch pairs, AV, BU and BV, operate similarly so that each produces four operational states controlled by controller 1 (FIG. 1) Cyclo-converter 7 is capable of being controlled to be in any one of 256 different conduction states.

The voltage pulses propagating through the HF transformer are applied to cyclo-converter 7 (FIG. 3) to make the A_BUS positive with respect to the B_BUS for one half of the HF cycle and to make the B_BUS positive with respect to the A_BUS for the other half of the HF cycle.

A direct mode is defined so that when the voltage on the A_BUS is greater than the voltage on the B_BUS, the switches of cyclo-converter 7 ensure that the voltage on the U node will be greater than the voltage on the V node, and so that when the voltage on the A_BUS is less than the voltage on the B_BUS the switches of cyclo-converter 7 ensure that the voltage on the U node will be less than the voltage on the V node. An inverted mode is defined so that when the voltage on the A_BUS is greater than the voltage on the B_BUS, the switches of cyclo-converter 7 ensure that the voltage on the U node is less than the voltage on the V node, and so that when the voltage on the A_BUS is less than the voltage on the B_BUS, the switches of cyclo-converter 7 ensure that the voltage on the U node will be greater than the voltage on the V node.

By using the correct cycling of the switches AUP, AVN, BUN, BVP, AUN, AVP, BUP and BVN, cyclo-converter 7 can be operated to switch between direct and inverted modes to ensure that (1) the voltage on the U node is always greater than the voltage on the V node, (2) the voltage on the U node is always less than the voltage on the V node, or (3) the polarity of the voltage on the U node with respect to the voltage on the V node alternates with a frequency that depends on the cycling of the switches AUP, AVN, BUN, BVP, AUN, AVP, BUP and BVN and does not depend on the frequency HF.

For example, when it is desired to ensure that the voltage on the U node is always greater than the voltage on the V node regardless of the phases of the HF cycles, controller 1 (FIG. 1) controls all of the switch elements of cyclo-converter 7 to cause the voltage on node U to always be more positive than the voltage on node V.

During the half of an HF cycle when the voltage on the A_BUS is positive with respect to the voltage on the B_BUS (see FIG. 4), and the inductor current is positive the voltage on the A_BUS is passed from the A_BUS through the switch element of switch AUP, through the diode of switch AUN onto node U. At the same time, current is drawn from node V through the switch element of switch BVP, through the diode of switch BVN to the B_BUS until the voltage on node V is substantially the same (less voltage drops across the switches of switch pair BV) as the voltage on the B_BUS.

Similarly, during the other half of the HF cycle when the voltage on the B_BUS is positive with respect to the voltage on the A_BUS (see FIG. 5), and the inductor current is positive the voltage on the B_BUS is passed from the B_BUS through the switch element of switch BUP, through the diode of switch BUN onto node U. At the same time, current is drawn from node V, through the switch element of switch AVP, through the diode of switch AVN to the A_BUS until the voltage on node V is substantially the same (less voltage drops across the switches of switch pair BV) as the voltage on the A_BUS.

Thus, in the way depicted in FIGS. 4 and 5, the cyclo-converter switches are operated by controller 1 to apply a voltage to node U that is always more positive than the voltage applied to node V, regardless of whether the A_BUS is more positive than the B_BUS, or the other way around. Similarly, in the N topology, when the cyclo-converter switches are operated in the way depicted in FIGS. 6 and 7, a voltage can be applied to node U that is always more negative (thus the term N topology) than the voltage applied to node V, regardless of whether the A_BUS is more positive than the B_BUS, or the other way around. For example, when it is desired to ensure that the voltage on the V node is always greater than the voltage on the U node regardless of the phases of the HF cycles, controller 1 (FIG. 1) controls all of the switch elements of cyclo-converter 7 to cause the voltage on node V to always be more positive than the voltage on node U.

In an alternating waveform example, for example alternating at 60 Hz, the cyclo-converter 7 is operated to alternate between the first example above FIGS. 4 and 5) and second example above (FIGS. 6 and 7). By alternating between the above described topologies, an alternating voltage waveform can be provided between nodes U and V where the rate of switching between the topologies may be selected arbitrarily in a range between dc (i.e., either the first topology alone or the second topology alone, but not alternating) and a frequency just below the switching frequency of the HF inverter, at which aliasing may be troublesome.

The particular frequency of alternations between the first topology and the second topology is defined by the logic in the controller 1 which generates the control signals that operate the switches in cyclo-converter 7. In most systems, the frequency of alternations between the first and second modes and back will be 60 Hz to be compatible with loads designed to operate on terrestrial ac power systems that operate at 60 Hz. However, other frequencies are also desirable such as 400 Hz, 900 Hz and even 1,600 Hz, since these frequencies are also occasionally used in standard ac power systems.

Hall effect sensor H, capacitor C and inductor L form a filter that spans across nodes U and V. The filter constant, LC, of this filter is designed as a low pass filter to remove frequencies higher than the frequency of alternations between the P and N topologies, mainly the inverter HF frequency. Hall effect sensor H provides feedback to controller 1 to inform the controller of the current direction passing through inductor L. Because the LC filter stores energy, and because loads have lead or lag power factors due to reactance, the current through sensor H is a function of the history of the currents through the LC filter, the reactance of the LC filter and any external load.

In typical operation, HF inverter 3 switches at a sufficient rate that a full cycle repeats at a predetermined rate that may be selected between from 2,000 Hz to 40,000 Hz, or more typically between 3,000 Hz to 30,000 Hz. During a first half cycle switches S1 and S4 are on turned while switches S2 and S3 are turned off so that current flows into the dotted side of transformer 5, and the voltage V_DC from the dc power source is applied to transformer 5 so that the voltage applied to the dotted side of the primary winding of transformer 5 is more positive than the voltage applied to the other side of the primary winding. During the other half cycle switches S2 and S3 are turned on while switches S1 and S4 are turned off so that current flows out of the dotted side of transformer 5, and the voltage V_DC from the dc power source is applied to transformer 5 so that the voltage applied to the dotted side of the primary winding of transformer 5 is more negative than the voltage applied to the other side of the primary % winding. By alternating these half cycles, a square wave voltage is applied to the primary winding of transformer 5. Switches S1 and S4 are closed for a first half cycle while switches S2 and S3 are open so that current flows through the primary of transformer 5 in one direction. Then, for the other half cycle switches S2 and S3 are closed while switches S1 and S4 are open so that current flows through the primary of transformer 5 in the opposite direction. Generally, the size of the transformer, and in particular the core material of the transformer, the windings, etc. of the transformer, are selected so that the core material does not become magnetically saturated during a half cycle.

When controller 1 operates cyclo-converter 7 in either a first topology or a second topology as discussed above with respect to FIGS. 4-7, the power transferred to the cyclo-converter output OUTPUT (FIGS. 4-7) is maximized during what is referred to as the power transfer period (PT period). However in many instances, less than full power transfer is desired. To achieve this, pulse width modulation (PMW) of the switches in cyclo-converter 7 is employed to provide no power transfer, and importantly no power loss, during what is referred to as the free wheeling period (FW period) which is described below.

To understand how PWM creates a FW period, consider only the first topology described above with respect to FIGS. 4 and 5, where the switches of cyclo-converter 7 are operated by controller 1 to apply a voltage to node U that is always more positive than the voltage applied to node V regardless of whether the A_BUS is more positive that the B_BUS or the other way around. During a first half cycle of the HF cycle (50% duty cycle of the full HF cycle), switches of switch pair AU are operated to apply a positive voltage from the A_BUS to node U, and during the other half of the HF cycle (50% duty cycle of the full HF cycle), switches of switch pair BU are operated to apply a positive voltage from the B_BUS to node U as discussed above.

In order to provide less than full power transfers each half cycle (50% duty cycle of the full HF cycle) is divided into a power transfer PT period (using either the P or N topology discussed above) and a freewheeling FW period. For example, in the first half of an HF cycle, the power transfer PT period might be 25% of the full HF cycle and the freewheeling FW period might be the remaining 25% of the full HF cycle. Then, in the other half of the HF cycle, the power transfer PT period might also be 25% of the full HF cycle and the freewheeling FW period might also be the remaining 25% of the full HF cycle During a freewheeling period, controller 1 controls the switches of cyclo-converter 7 so that nodes U and V are shorted together. One way to do this is to short the A_BUS to both the U and V nodes as depicted in FIG. 8 (current flowing from node U to node V through inductor L and sensor H) and FIG. 9 (current flowing from node V to node U through inductor L and sensor H). Another way to do this is to short the B_Bus to both the U and V nodes. In either case, it is undesirable to abruptly alter the current since this abrupt current change leads to large voltage spikes that may damage some of the circuit components.

If current is flowing from inductor L through Hall effect sensor H into capacitor C, the switch elements of switches AUP and AVP are turned on as depicted in FIG. 8 so that current continues to flow in a circuit from capacitor C through the switch element of switch AVP through the diode of switch AVN onto the A_BUS, then through the switch element of switch AUP, through the diode of switch AUN and back into inductor L. The voltage between nodes U and V is short circuited together and clamped to the voltage of the A_BUS except for some small voltage drops across the switches, but the current through inductor L continues to flow uninterrupted. Controller 1 is aware of the direction of the current flow because Hall effect sensor H senses the current direction and reports the direction to the controller.

Similarly, if current is flowing from capacitor C through Hall effect sensor H into inductor L, the switch elements of switches AUN and AVN are turned on as depicted in FIG. 9.

Current continues to flow in a circuit from inductor L through the switch element of switch AUN through the diode of switch AUP onto the A_BUS, then through the switch element of switch AVN, through the diode of switch AVP and back into capacitor C. The voltage between nodes U and V is short circuited and clamped to the voltage of the A_BUS except for some small voltage drops across the switches, but the current through inductor L continues to flow uninterrupted. Controller 1 is aware of the direction of the current flow because Hall effect sensor H senses the current direction and reports the direction to the controller.

Alternatively, controller 1 could control the switch elements of switches AUP, AVP and AUN, AVN so that all are on during the FW period, and there would be no need to sense the current direction from Hall effect sensor H. This arrangement would clamp the voltages on nodes U and V to the A_BUS.

Alternatively, controller 1 could control the switches of cycloconverter 7 during the freewheeling period to clamp the voltages on nodes U and V to the B_BUS by similarly controlling the switch elements of switches BUP and BVP to be on when Hall effect sensor H senses that current is flowing from inductor L through Hall effect sensor H into capacitor C, and controlling the switch elements of switches BUN and BVN to be on when Hall effect sensor H senses that current is flowing from capacitor C through Hall effect sensor H into inductor L. Also, in an alternative variant, controller 1 could control the switches of cyclo-converter 7 during the freewheeling period so that the switch elements of switches BUP, BUN, BVN and BVP are all on regardless of the direction of current flow.

In any case of freewheeling discussed above, power is not transferred through the cyclo-converter 7 during the freewheeling period because the voltage between nodes U and V is shorted together. This reduces the amount of power being transferred into inductor L and capacitor C, and as a result, reduces the amount of power transferred to the load. In the specific exemplary case where the power transfer PT period is 25% of the full HF cycle during the first half of the BF cycle, and the freewheeling FW period is 25% of the full HF cycle. In the other half of the HF cycle, the power transfer PT period is 25% of the full HF cycle, and the freewheeling FW period is 25% of the full HF cycle. Therefore, only 50% (e.g., 25% of each half cycle) of maximum transferable power is actually transferred through cyclo-converter 7. The filter constant, LC, of the filter between nodes U and V is chosen to have a time constant LC that smoothes out the HF power pulses. This will average out the fluctuations in the output terminal (i.e., the node between capacitor C and Hall effect sensor H) and node V. In this context, capacitor C functions a shunt capacitor between the output terminal OUTPUT (i.e., the node between capacitor C and Hall effect sensor H) and node V, and inductor L functions as an input choke, a so called swinging choke, to reduce voltage spikes before reaching the output terminal OUTPUT.

To achieve a sinusoidal shaped voltage output waveform, controller 1 controls the switches of cyclo-converter 7 to modulate the percentage of a half cycle that is used for freewheeling FW periods and the corresponding percentage of the half cycle that is used for power transfer PT periods. For a sine wave beginning at phase angle zero, all of the half cycle (i.e., 50% of the full cycle) is initially used for the freewheeling FW periods, and none of the half cycle is used for the power transfer PT period. Thus, initially, the voltage output of the cyclo-converter is zero. The percentage of the half cycle that is used for the power transfer PT period is gradually increased until a peak is reached at a 90 degree phase angle (the peak of a sine wave) and then the percentage is gradually decreased to zero again at a 180 degree phase angle. The corresponding percentage of the half cycle used for the freewheeling FW period is correspondingly gradually decreased to a minimum and then gradually increased. The exact rate of increases and decreases in these percentages a selected to provide a half period of sinusoidal output voltage at the output terminal OUTPUT referenced to node V at the desired output frequency, for example 60 Hz. For example, if the desired output frequency is 60 Hz, the half period would be 1/120 part of a second or eight and one-third milliseconds. Triangular or square wave waveforms may also be produced by controlling the switches of the cyclo-converter in this way.

In addition to forming the basic waveform shape, controller 1 commands cyclo-converter 7 to control the scale of the output voltage waveform, i.e., the RMS of the voltage delivered. Controller 1 commands cyclo-converter 7 to modulate the percentage of a half cycle that is used for freewheeling FW periods in such a way that the output voltage waveform is scaled in magnitude according to a desired peak sinusoid amplitude.

At the end of an eight and one-third millisecond half waveform cycle period, a zero voltage crossing occurs and the eight and one-third millisecond half waveform cycle period is repeated with the voltages on nodes U and V reversed.

With this cyclo-converter operation, an arbitrary output waveform can be provided at an arbitrary but predetermined frequency defined by controller. The predetermined frequency can be any frequency from dc to just below the HF inverter cycle frequency (e.g., 3,000 Hz to 30,000 Hz).

M. Matsui, M. Nagai, M. Mochizuki, and Nabae describe an operation of a cyclo-converter in a PWM mode in a paper titled "High-Frequency Link AC/DC Converter With Suppressed Voltage Claim Circuits—Naturally Commutated Phase Angle Control With Self Turn-Off Devices," published in IEEE Transactions On Industry Applications, Vol. 33, No. 2, March/April 1996, pp 293-300. In the paper, Matsui et al. describe transitions between three different states of the cyclo-converter: a direct state where the voltage between nodes U and V is controlled to be equal to the voltage between the A_BUS and the B_BUS, an inverted state where the voltage between nodes U and V is controlled to be equal to the negative of the voltage between the A_BUS and the B_BUS, and a zero state where the voltage between nodes U and V are short circuited together by either connecting A side switches to the A_BUS or B side switches to the B_BUS. Controller 1 causes the cyclo-converter to be switched between the direct, inverted and zero states at high frequencies (HF) in order to ensure output voltage control. Depending on the polarity of the voltage between the A_BUS and the B_BUS, and depending on the direction of the current through the inductor L as sensed by Hall effect device H, controller 1 causes specific transitions between the direct, inverted and zero states.

When the voltage between the A_BUS and the B_BUS is greater than zero, and when the current through the inductor L in the direction from node U toward node V is also greater than zero, Matsui et al. uses the P topology and permit four specific transitions. Controller 1 may cause a transition selected from any of the following four transitions: from the zero state (A side) to the direct state; from the zero state (B side) to the direct state; from the inverted state to the zero state (A side); and from the inverted state to the zero state (B side).

When the voltage between the B_BUS and the A_BUS is greater than zero, and when the current through the inductor L in the direction from node V toward node U is also greater than zero, Matsui et al. uses the N topology and also permit four specific transitions. Controller 1 may cause a transition selected from any of the following four transitions: from the zero state (A side) to the direct state; from the zero state (B side) to the direct state; from the inverted state to the zero state (A side); and from the inverted state to the zero state (B side).

When the voltage between the A_BUS and the B_BUS is greater than zero, and when the current through the inductor L in the direction from node V toward node U is also greater than zero, Matsui et al. uses the N topology and permit four specific transitions. Controller 1 may cause a transition selected from any of the following four transitions: from the direct state to the zero state (A side); from the direct state to the zero state (B side); from the direct state to the inverted state; and from the inverted state to the direct state.

When the voltage between the B_BUS and the A_BUS is greater than zero, and when the current through the inductor L in the direction from node U toward node V is also greater than zero, Matsui et al. uses P topology and permit four specific transitions. Controller 1 may cause a transition selected from any of the following four transitions: from the direct state to the zero state (A side); from the direct state to the zero state (B side); from the direct state to the inverted state; and from the inverted state to the direct state.

Current commutation according to Matsui et al. relies on knowledge of the direction of current through inductor L as may be sensed by Hall effect sensor H. However, when the current through inductor L is near a zero crossing, even good sensors fail to reliably detect the direction of the current. The true signal output of the sensor, proportional to current through sensor H, is overwhelmed by noise. Determining the zero current crossing of the current through inductor L can be quite difficult. If the direction of the inductor current is wrongly determined, Matsui will wrongly switch from the P-topology to N-topology or vice versa, interrupting the inductor current, and causing a voltage spike between the nodes U and V, potentially damaging the circuit components. Although controller 1 will, in general, have a priori knowledge of the voltage applied to output filter LC (i.e., between nodes U and V), and although the controller could be designed to have a priori knowledge of the values of inductor L and capacitor C, controller 1 will not, in general, have a priori knowledge of the reactance of the system's load, either capacitive or inductive. The current through inductor L will vary in phase from the voltage applied between nodes U and V by an unknowable amount. Therefore, there exists a need to have an improved method of current commutation near the zero current crossing point that does not require knowledge of the direction of the current through inductor L.

SUMMARY OF THE INVENTION

A cyclo-converter includes a first port having first and second nodes [A, B] and a second port having first and second nodes [U, V]. The cyclo-converter further includes first, second, third and fourth switch pairs. The first switch pair [AU] is coupled between the first node [A] of the first port and the first node [U] of the second port. The second switch pair [BU] is coupled between the second node [B] of the first port and the first node [U] of the second port. The third switch pair [AV] is coupled between the first node [A] of the first port and the second node [V] of the second port. The fourth switch pair [BV] coupled between the second node [B] of the first port and the second node [V] of the second port. Each switch pair includes a switch of a first topology type and a switch of a second topology type in series connection.

An embodiment of a method according to the invention includes switching a first switch of the first topology type to an on state after a magnitude of a current through an output inductor becomes less than a predetermined current threshold. The embodiment of the method further includes switching a second switch of the first topology type to an off state a first predetermined time after switching the first switch of the first topology type to the on state.

An embodiment of another method according to the invention includes switching a first switch of the first topology type to an on state after a magnitude of a current through an output inductor becomes less than a predetermined current threshold, and switching a second switch of the first topology type to an off state a first predetermined time after switching the first switch of the first topology type to the on state. The embodiment of the method further includes switching a first switch of the second topology type to an on state a second predetermined time after switching the second switch of the first topology type to the off state, and switching a second switch of the second topology type to an off state a third predetermined time after switching the first switch of the second topology type to the on state.

A computer readable media contains modules capable of controlling a processor to control a cycloconverter. An embodiment of a computer readable media according to the invention includes a first module to control the processor to switch a first switch of a first topology type to an on state after a magnitude of a current through an output inductor becomes less than a predetermined current threshold (S1 of FIG. 11 or S5 of FIG. 12), and a second module to control the processor to switch a second switch of the first topology type to an off state a first predetermined time after switching the first switch of the first topology type to the on state (S2 of FIG. 11 or S6 of FIG. 12).

An embodiment of another computer readable media according to the invention includes a first module to control the processor to switch a first switch of a first topology type to an on state after a magnitude of a current through an output inductor becomes less than a predetermined current threshold (S1 of FIG. 11 or S5 of FIG. 12), and a second module to control the processor to switch a second switch of the first topology type to an off state a first predetermined time after switching the first switch of the first topology type to the on state (S2 of FIG. 11 or S6 of FIG. 12). The computer readable media further includes a third module to control the processor to switch a first switch of a second topology type to an on state a second predetermined time after switching the second switch of the first topology type to the off state (S3 of FIG. 11 or S7 of FIG. 12), and a fourth module to control the processor to switch a second switch of the second topology type to an off state a third predetermined time after switching the first switch of the second topology type to the on state (S4 of FIG. 11 or S8 of FIG. 12).

BRIEF DESCRIPTION OF DRAWINGS

The invention will be described in detail in the following description of preferred embodiments with reference to the following figures.

FIG. 12 is a flow chart showing another embodiment of a method of the control scheme according to the present invention.

DETAILED DESCRIPTION OF PREFERRED EMBODIMENTS

Initially it should be noted that it is easy to determined the polarity of the voltage on the A_BUS relative to the B_BUS for at least two reasons. First, the HF inverter 3 provides a chopped waveform that approximates a square wave. The voltage on the A_BUS and the voltage on the B_BUS are never equal for any substantial period of time. Therefore, at a minimum, a voltage difference sensor can easily detect the voltage difference. Second, in almost all preferred embodiments, controller 1 provides control signals to both the HF inverter 3 and the cyclo-converter 7; therefore, the controller 1 will have a priori knowledge of the voltage on the A_BUS relative to the B_BUS since controller 1 causes this voltage difference by the way it controls the HF inverter 3. There is no need for a separate sensor to determine the voltage on the A_BUS relative to the B_BUS.

In an embodiment of the present invention, the output of the Hall effect sensor H is read by the controller. The peak-to-peak amplitude of the current waveform is determined, and a threshold is determined as a predetermined percentage of that amplitude. The magnitude of the current indicated by the Hall effect sensor is determined and compared to the threshold. When the magnitude of the current is less than the threshold, a safe commutation mode is entered. The safe commutation mode is not exited until after the magnitude of the current is again greater than the threshold. The threshold is selected such that the indicated current from the Hall effect sensor H is sufficiently distant from zero current to reliably be detected, given the noise environment of the system.

While operating in the safe commutation mode, a special commutation sequence is used. This commutation sequence, unlike the sequences of Matsui et al. cited above, provides at least one current path from one end of the HF transformer secondary through inductor L to the other end of the HF transformer secondary. Leakage inductance in the transformer secondary could cause large voltage spikes if the current path were to be interrupted, even momentarily.

Therefore, in the safe commutation mode, there is always a current path through which energy stored in a magnetic field of the leakage inductance can be passed. Furthermore, since the direction of current through inductor L may be either way at points near the zero crossing, this current path must accommodate currents passing either way through inductor L.

In the safe commutation mode, with currents capable of passing either way through inductor L, It is necessary to prevent voltage shoot through. Voltage shoot through is a condition where switches are turned on so that current can flow directly from the A_BUS to the B_BUS or vice versa without passing through inductor L. In an exemplary embodiment, this is achieved in a four step sequence.

Figure 1:
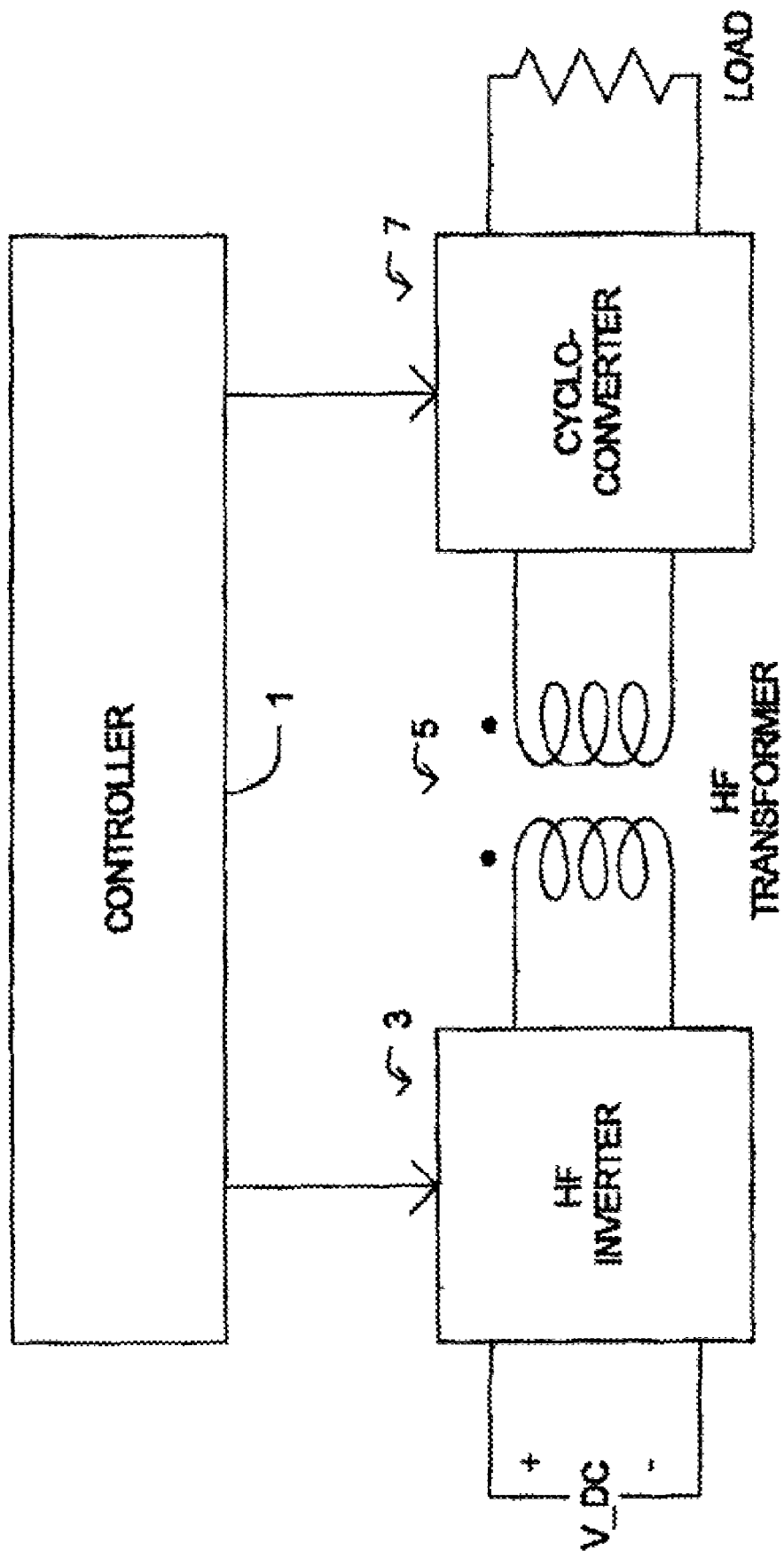
FIG. 1 is a function block diagram depicting a dc to ac system of the type controlled according to the present invention.
Figure 2:
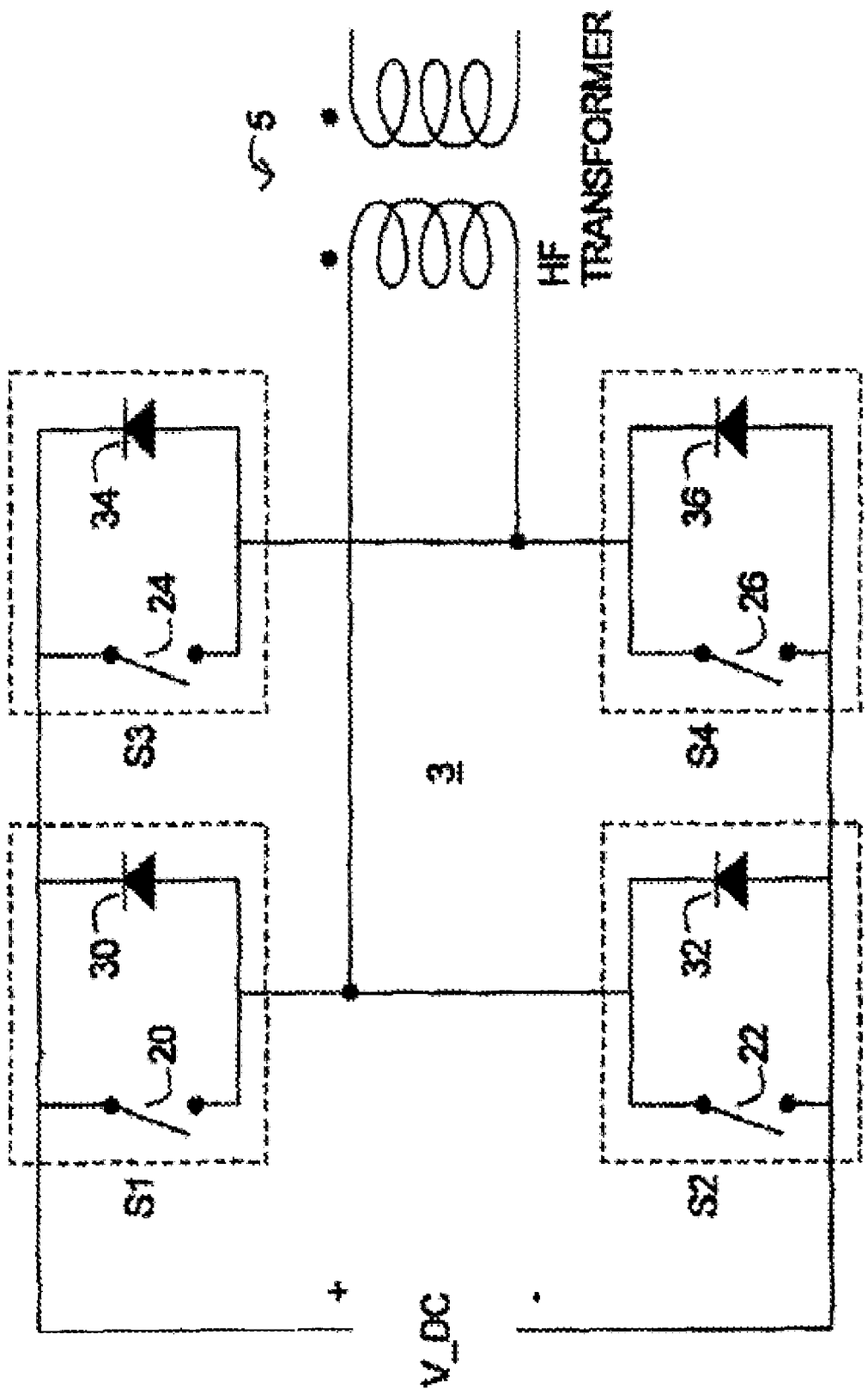
FIG. 2 is a schematic diagram of the HF inverter of FIG. 1.
Figure 3:
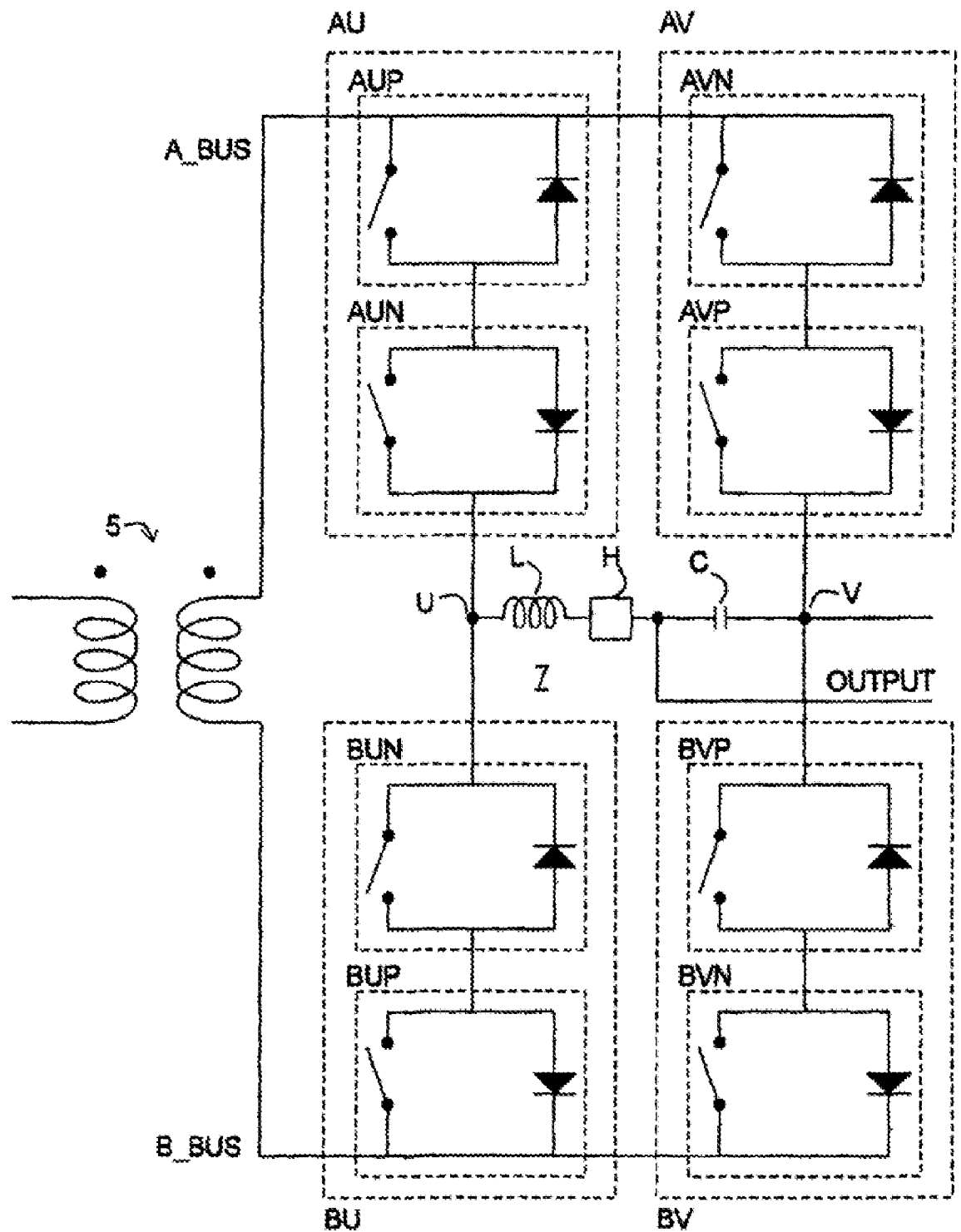
FIG. 3 is a schematic diagram of the cyclo-converter of FIG. 1.
Figure 4:
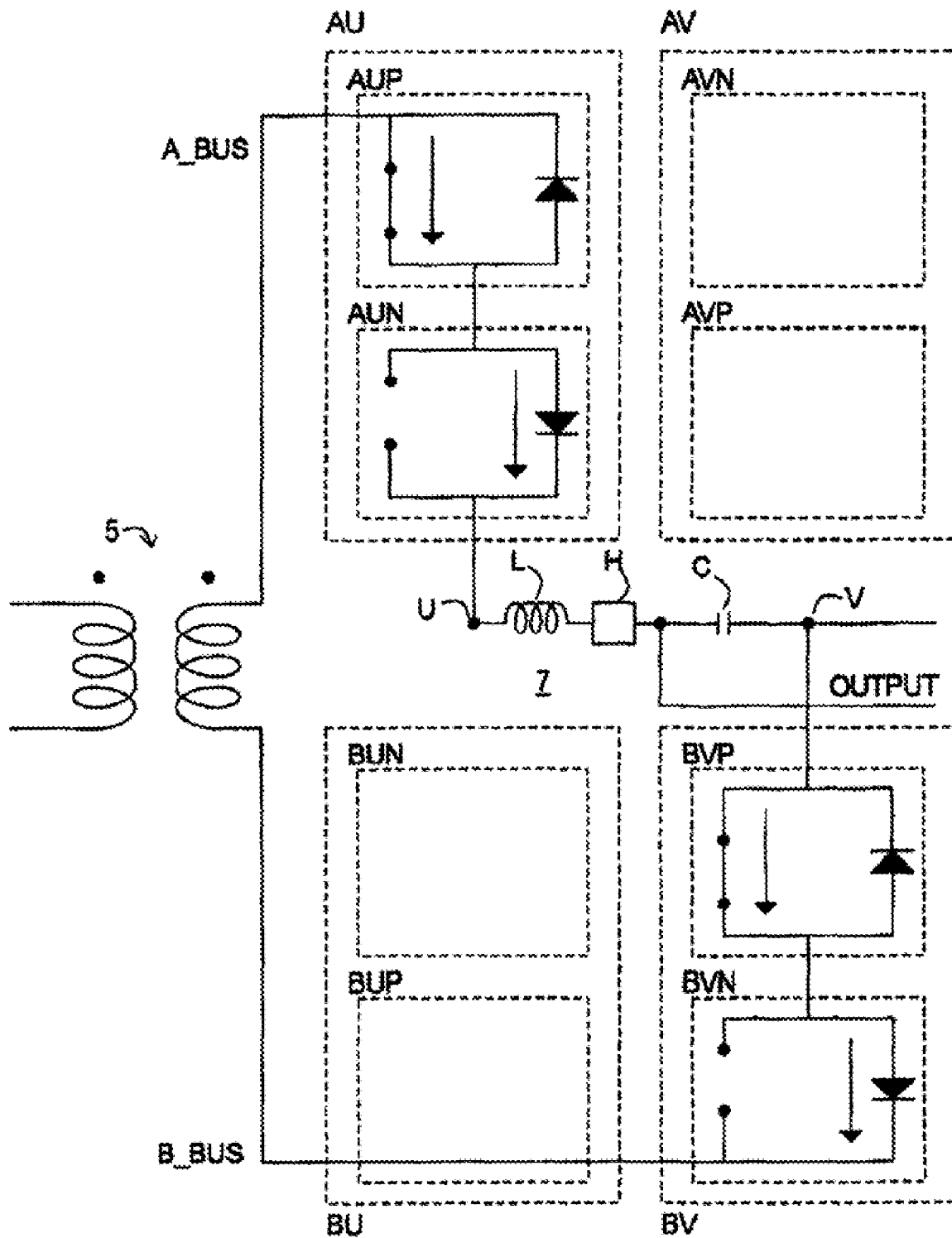
FIG. 4 is a circuit schematic diagram of the cyclo-converter of FIG. 3 showing a P topology operational setting of the switches for a power transfer condition when the voltage on the A_BUS is greater than the voltage on the B_BUS.
Figure 5:
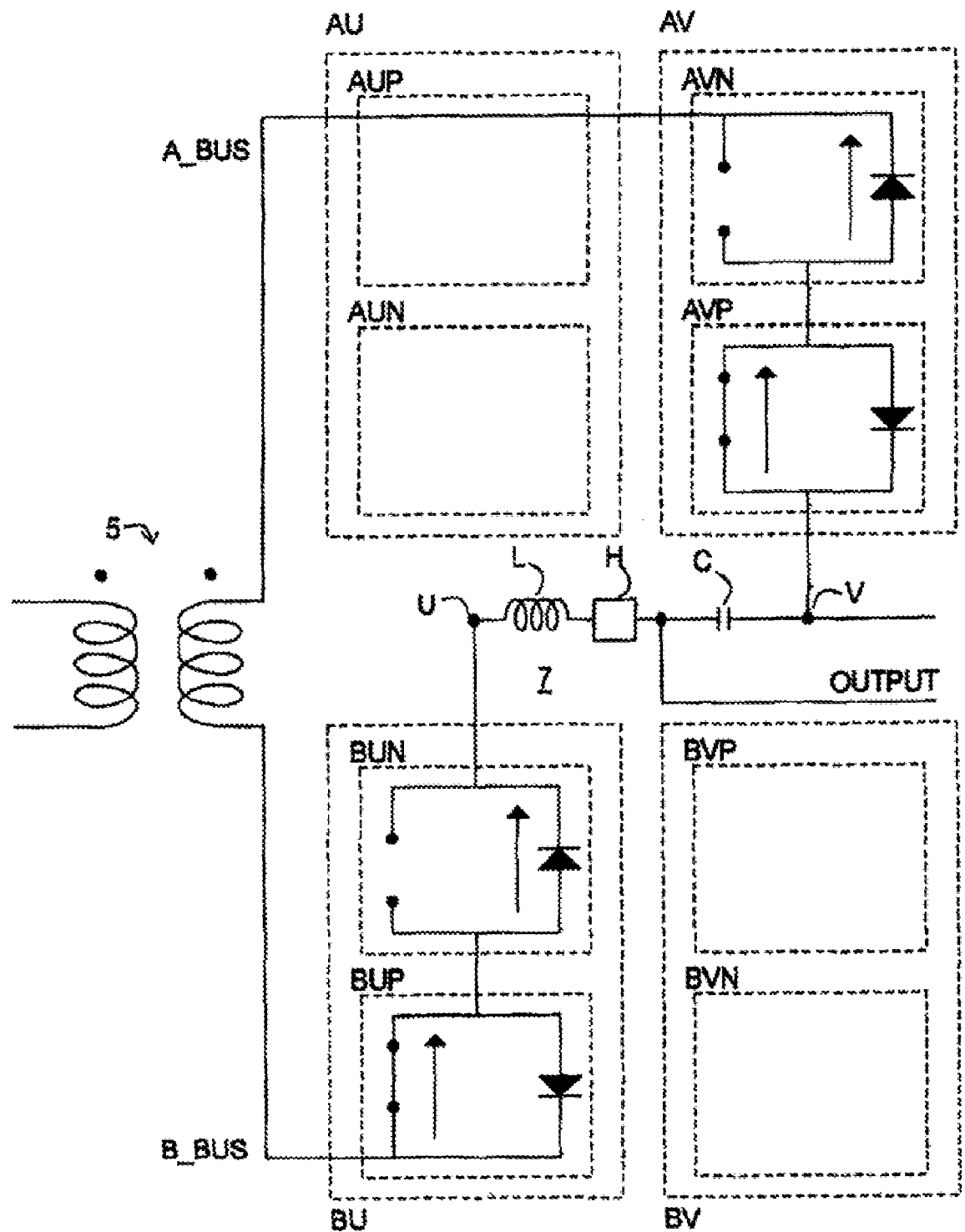
FIG. 5 is a circuit schematic diagram of the cyclo-converter of FIG. 3 showing a P topology operational setting of the switches for a power transfer condition when the voltage on the A_BUS is less than the voltage on the B_BUS.
Figure 6:
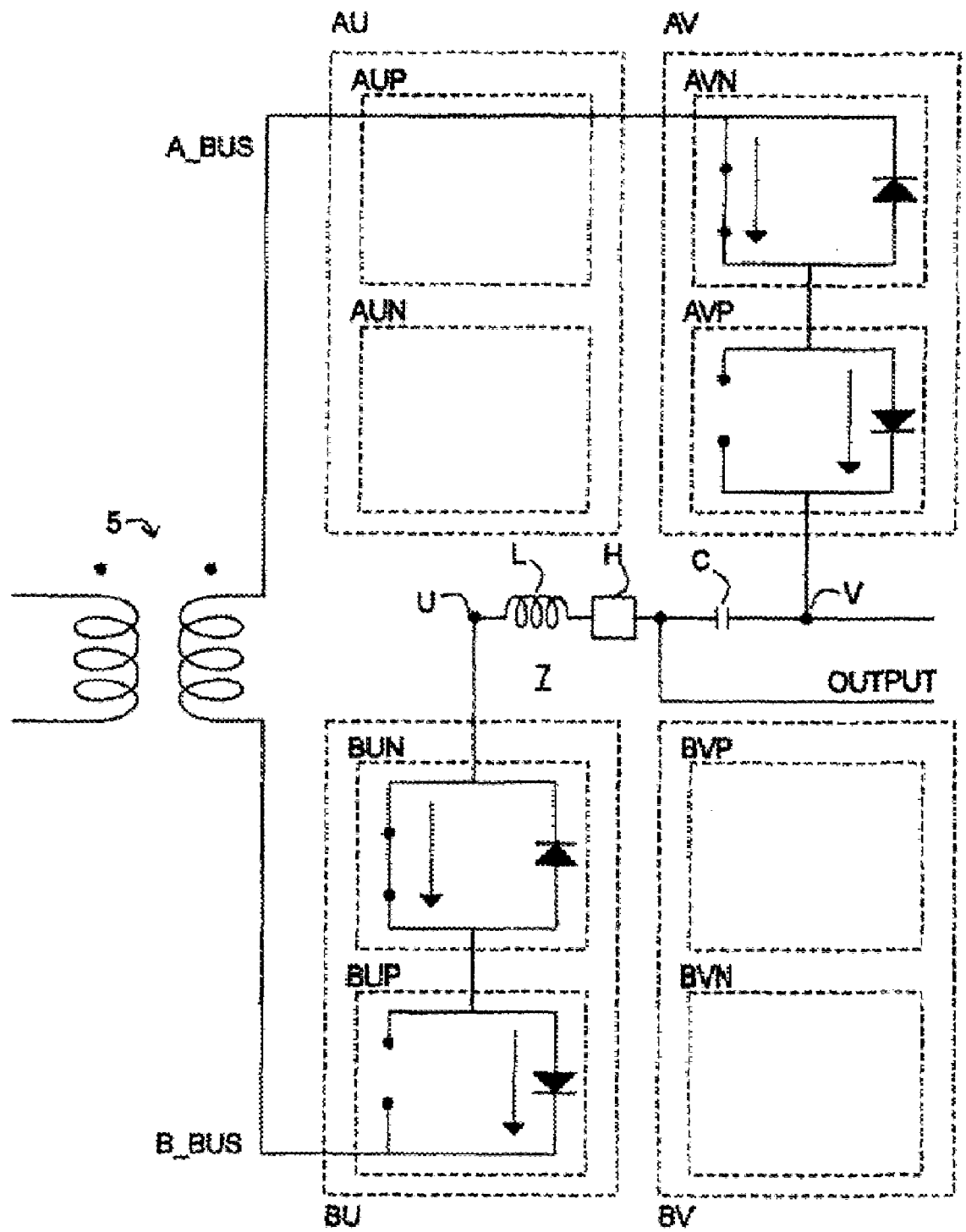
FIG. 6 is a circuit schematic diagram of the cyclo-converter of FIG. 3 showing an N topology operational setting of the switches for a power transfer condition when the voltage on the A_BUS is greater than the voltage on the B_BUS.
Figure 7:
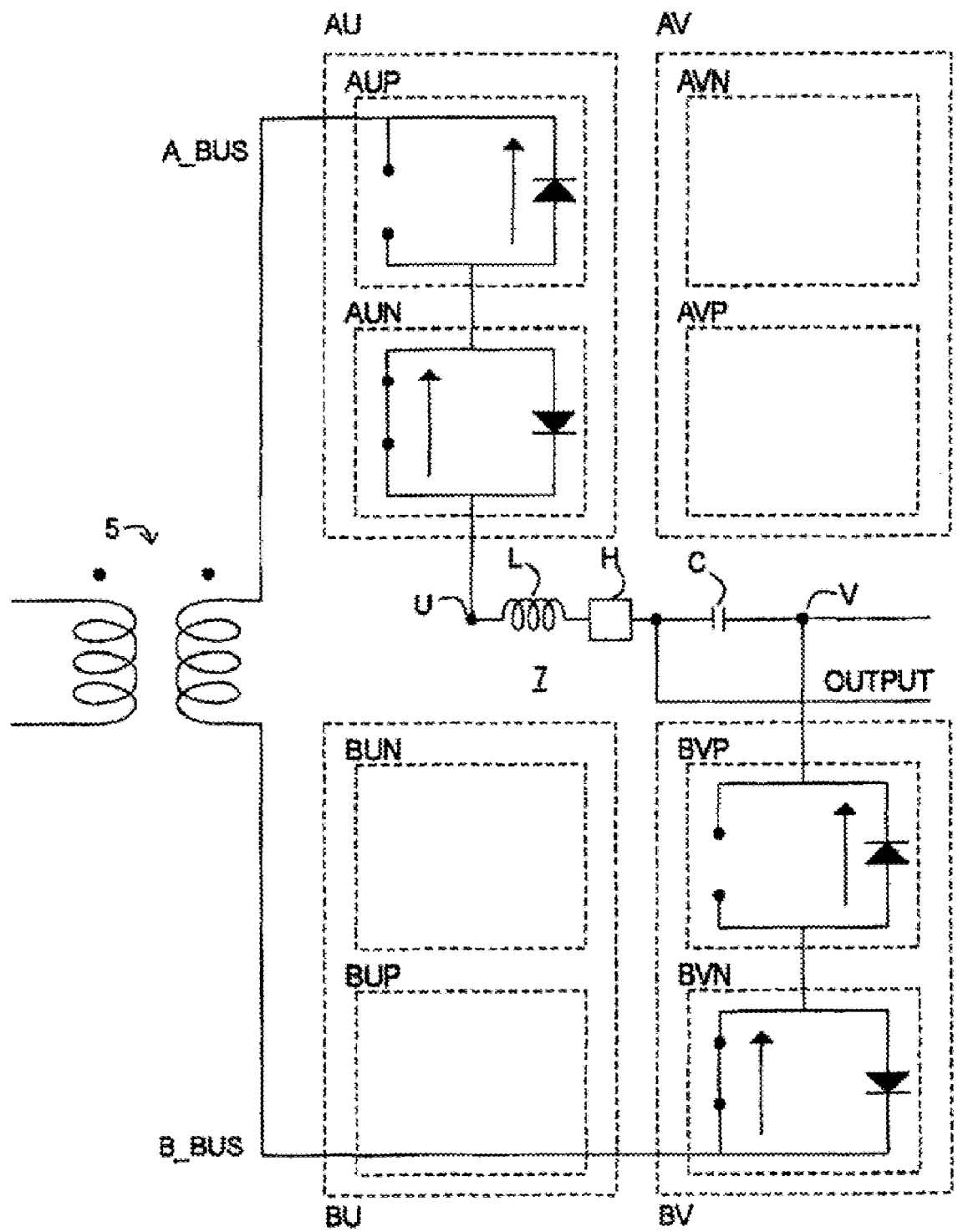
FIG. 7 is a circuit schematic diagram of the cyclo-converter of FIG. 3 showing an N topology operational setting of the switches for a power transfer condition when the voltage on the A_BUS is less than the voltage on the B_BUS.
Figure 8:
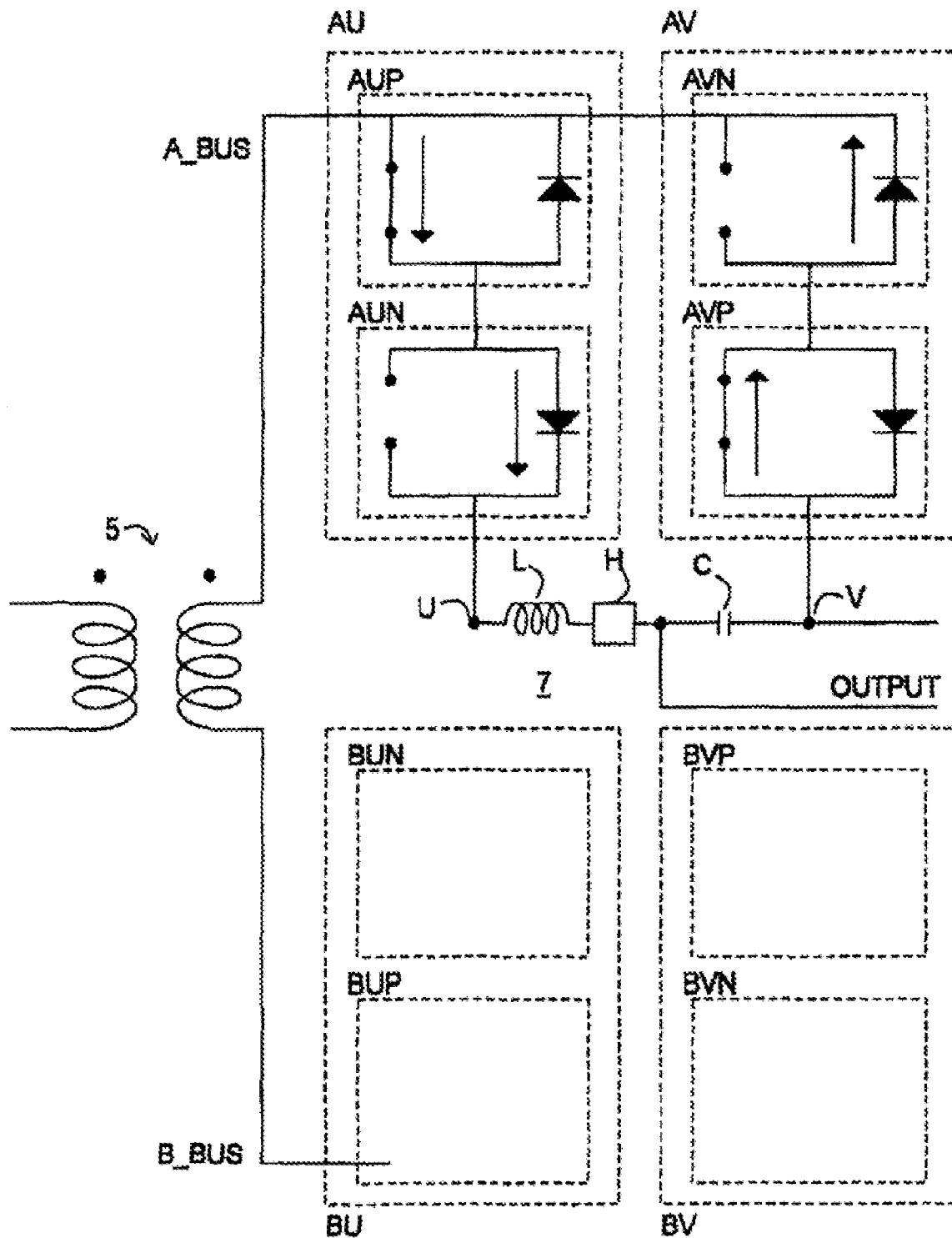
FIG. 8 is a circuit schematic diagram of the cyclo-converter of FIG. 3 showing one operational setting of the switches for a freewheeling condition.
Figure 9:
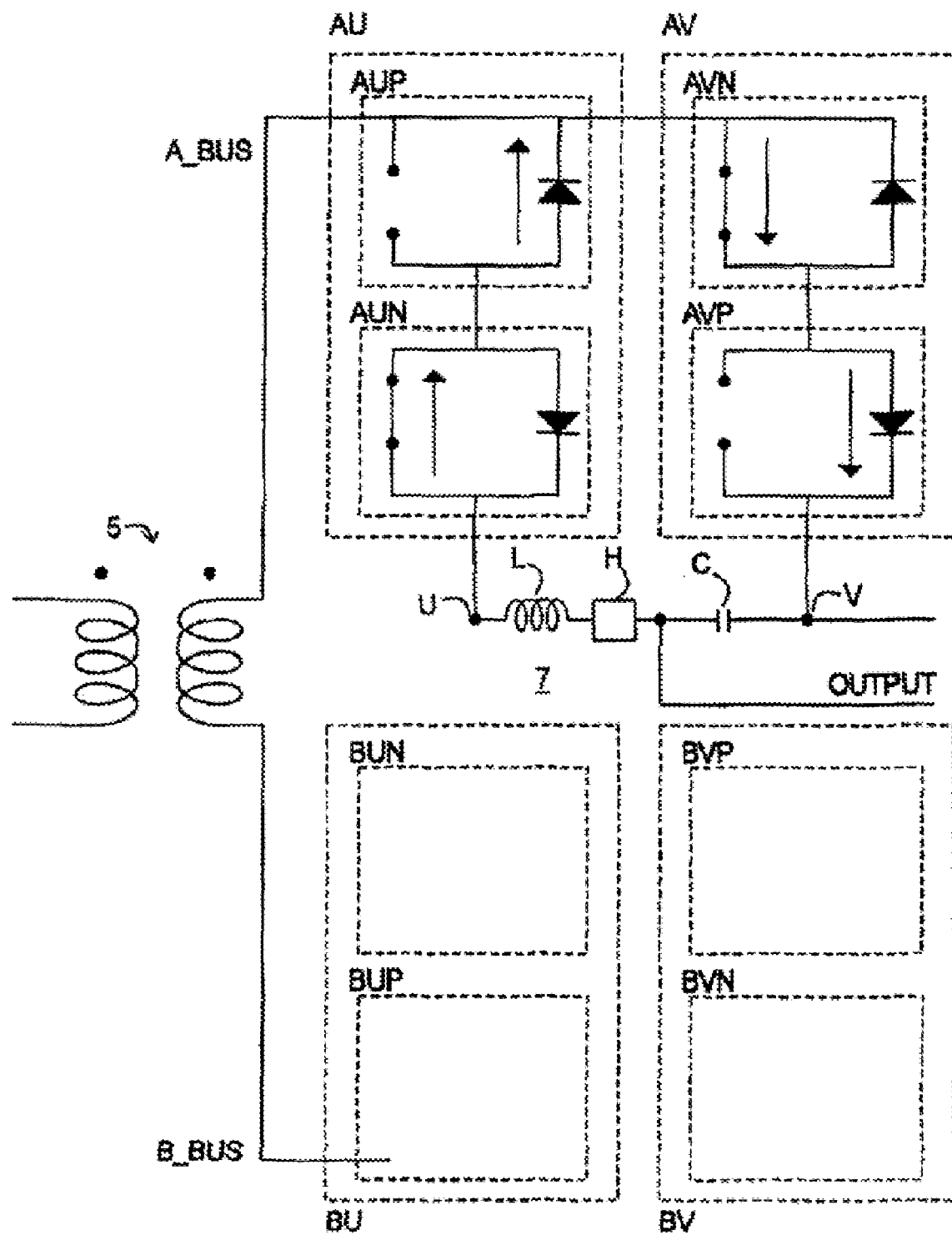
FIG. 9 is a circuit schematic diagram of the cyclo-converter of FIG. 3 showing another operational setting of the switches for a freewheeling condition.
Figure 10:
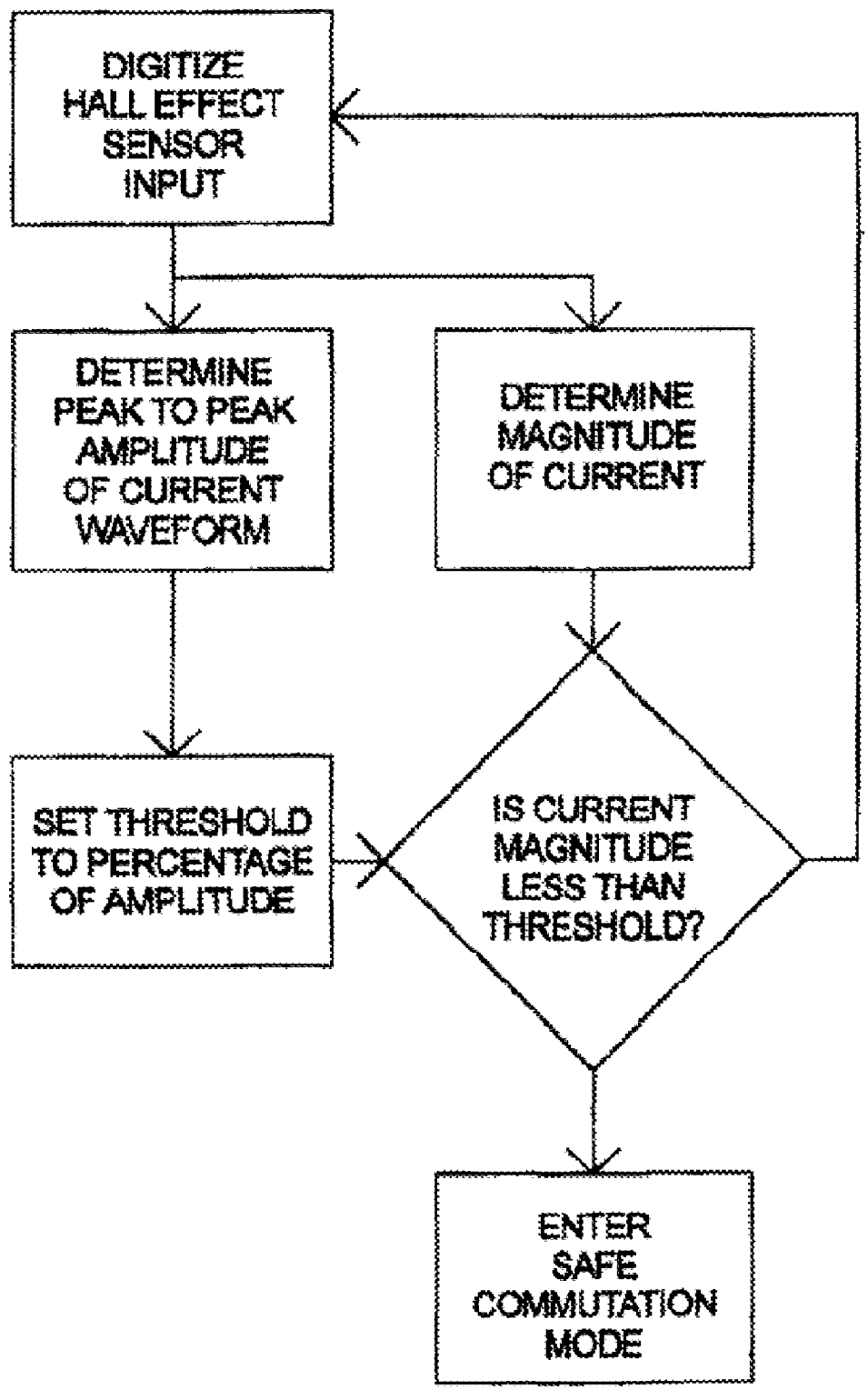
FIG. 10 is a flow chart showing an embodiment of the controller according to the present invention.
Figure 11:
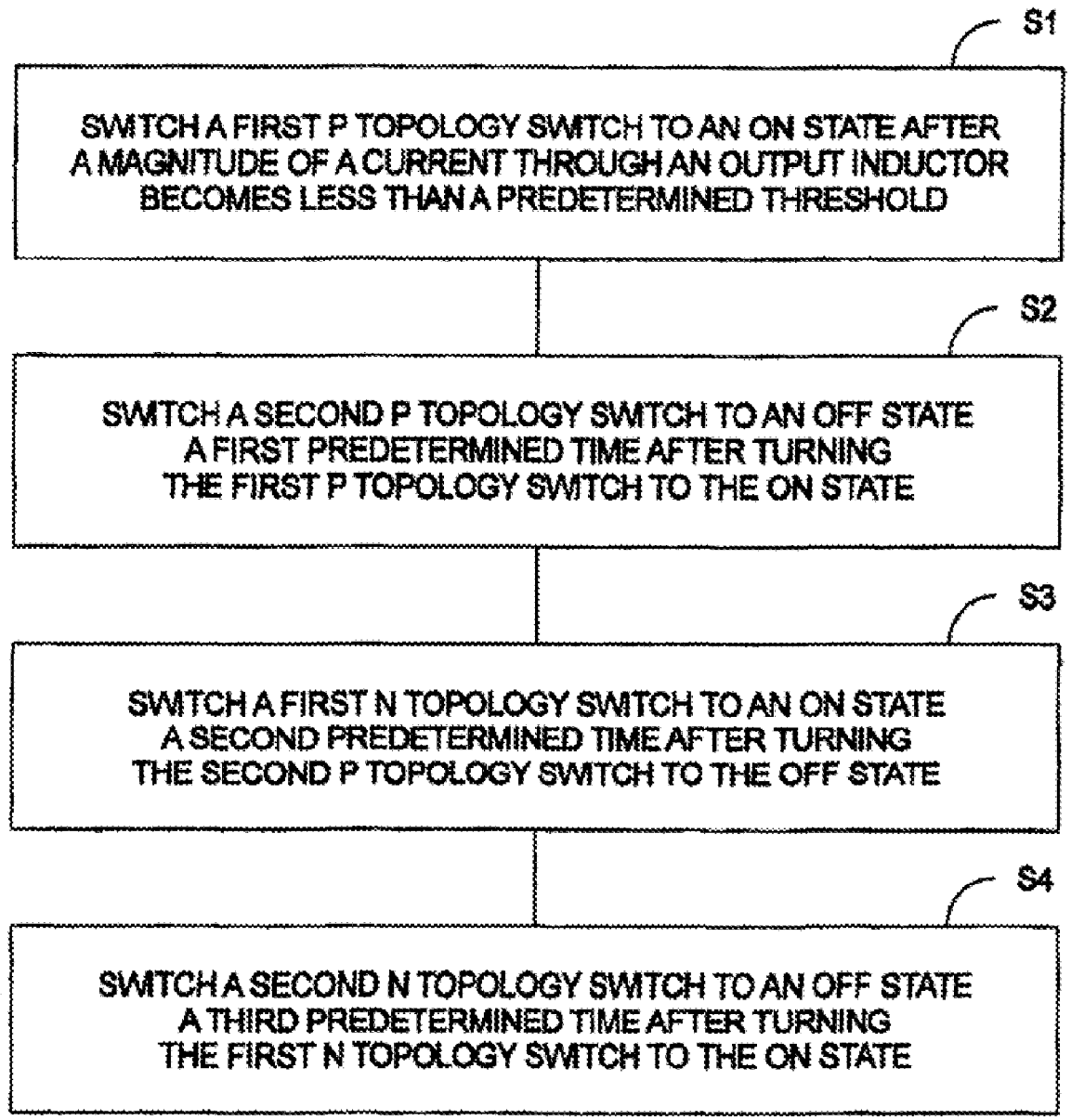
FIG. 11 is a flow chart showing an embodiment of a method of the control scheme according to the present invention.

In a general embodiment of the invention that uses a cyclo-converter as discussed above, a method includes switching a first switch of the first topology type to an on state after a magnitude of a current through an output inductor becomes less than a predetermined current threshold (S1 of FIG. 11 or S5 of FIG. 12). The method further includes switching a second switch of the first topology type to an off state a first predetermined time after switching the first switch of the first topology type to the on state (S2 of FIG. 11 or S6 of FIG. 12). In this embodiment either the first topology type is a P topology and the second topology type is an N topology as depicted in FIG. 11 or the first topology type is an N topology and the second topology type is a P topology as depicted in FIG. 12.

In another general embodiment of the method, the method includes switching a first switch of the first topology type to an on state after a magnitude of a current through an output inductor becomes less than a predetermined current threshold (S1 of FIG. 11 or S5 of FIG. 12) and further includes switching a second switch of the first topology type to an off state a first predetermined time after switching the first switch of the first topology type to the on state (S2 of FIG. 11 or S6 of FIG. 12). The method further includes switching a first switch of the second topology type to an on state a second predetermined time after switching the second switch of the first topology type to the off state (S3 of FIG. 11 or S7 of FIG. 12), and the method further includes switching a second switch of the second topology type to an off state a third predetermined time after switching the first switch of the second topology type to the on state (S4 of FIG. 11 or S8 of FIG. 12). In this embodiment either the first topology type is a P topology and the second topology type is an N topology as depicted in FIG. 11 or the first topology type is an N topology and the second topology type is a P topology as depicted in FIG. 12.

A first exemplary embodiment of the method of control is practiced on a cyclo-converter 7 that includes a first port having a first node A and a second node B. Cycle-converter 7 further includes a second port having a first node U and a second node V Cyclo-converter 7 further includes a first switch pair AU coupled between the first node A of the first port and the first node U of the second port. Cyclo-converter 7 further includes a second switch pair BU coupled between the second node B of the first port and the first node U of the second port. Cyclo-converter 7 further includes a third switch pair AV coupled between the first node A of the first port and the second node V of the second port. Cyclo-converter 7 further includes a fourth switch pair BV coupled between the second node B of the first port and the second node V of the second port. Each switch pair includes a P topology switch and an N topology switch in series connection.

In the first exemplary embodiment, the method includes switching a first P topology switch to an on state after a magnitude of a current through an output inductor becomes less than a predetermined current threshold (S1 of FIG. 11). Thus, upon entry of the safe commutation mode, the first P topology switch is switch to an on state. The method further includes switching a second P topology switch to an off state a first predetermined time after turning the first P topology switch to the on state (S2 of FIG. 11).

In a first variant of the first embodiment, the voltage on the first node A of the first port is positive with respect to the voltage on the second node B of the first port, and the controller is transitioning from a DIRECT state to a ZERO state where nodes U and V are connected to the A_BUS. In this first variant of the first embodiment, the switching of the first P topology switch switches the P topology switch AVP of the third switch pair AV, and the switching off the second P topology switch switches the P topology switch BVP of the fourth switch pair BV.

In a second variant of the first embodiment, the voltage on the first node A of the first port is positive with respect to the voltage on the second node B of the first port, and the controller is transitioning from a DIRECT state to a ZERO state where nodes U and V are connected to the B_BUS. In this second variant of the first embodiment, the switching of the switching of the first P topology switch switches the P topology switch BUP of the second switch pair BU, and the switching of the second P topology switch switches the P topology switch AUP of the first switch pair AU In a third variant of the first embodiment, the voltage on the first node A of the first port is negative with respect to the voltage on the second node B of the first port, and the controller is transitioning from a DIRECT state to a ZERO state where nodes U and V are connected to the A_BUS. In this third variant of the first embodiment, the switching of the first P topology switch switches the P topology switch AUP of the first switch pair AU, and the switching of the second P topology switch switches the P topology switch BUP of the second switch pair BU.

In a fourth variant of the first embodiment, the voltage on the first node A of the first port is negative with respect to the voltage on the second node B of the first port, and the controller is transitioning from a DIRECT state to a ZERO state where nodes U and V are connected to the A_BUS. In this fourth variant of the first embodiment, the switching of the first P topology switch switches the P topology switch BVP of the fourth switch pair BV, and the switching of the second P topology switch switches the P topology switch AVP of the third switch pair AV.

In a fifth variant of the first embodiment, the method further includes switching a first N topology switch to an on state a second predetermined time after turning the second P topology switch to the off state (S3 of FIG. 11), and switching a second N topology switch to an off state a third predetermined time after turning the first N topology switch to the on state (S4 of FIG. 11). The first, second and third predetermined times need not be equal. However, most commonly, they are equal since they are defined by control signals originating from controller 1.

In a first example of the fifth variant of the first embodiment, the voltage on the first node A of the first port is positive with respect to the voltage on the second node B of the first port, and the controller is transitioning from a DIRECT state to a ZERO state where nodes U and V are connected to the A_BUS. In this first example of the fifth variant of the first embodiment, the switching of the first P topology switch switches the P topology switch AVP of the third switch pair AV. The switching of the second P topology switch switches the P topology switch BVP of the fourth switch pair BV. The switching of the first N topology switch switches the N topology switch AVN of the third switch pair AV. The switching of the second N topology switch switches the N topology switch BVN of the fourth switch pair BV.

In a second example of the fifth variant of the first embodiment, the voltage on the first node A of the first port is positive with respect to the voltage on the second node B of the first port, and the controller is transitioning from a DIRECT state to a ZERO state where nodes U and V are connected to the B_BUS. In this second example of the fifth variant of the first embodiment, the switching of the first P topology switch switches the P topology switch BUP of the second switch pair BUP. The switching of the second P topology switch switches the P topology switch AUP of the first switch pair AU. The switching of the first N topology switch switches the N topology switch BUN of the second switch pair BU. The switching of the second N topology switch switches the N topology switch AUN of the first switch pair AU.

In a third example of the fifth variant of the first embodiment, the voltage on the first node A of the first port is negative with respect to the voltage on the second node B of the first port, and the controller is transitioning from a DIRECT state to a ZERO state where nodes U and V are connected to the A_BUS. In this third example of the fifth variant of the first embodiment, the switching of the first P topology switch switches the P topology switch AUP of the first switch pair AU. The switching of the second P topology switch switches the P topology switch BUP of the second switch pair BU. The switching of the first N topology switch switches the N topology switch AUN of the first switch pair AU. The switching of the second N toplogy switch switches the N topology switch BUN of the second switch pair In a fourth example of the fifth variant of the first embodiment, the voltage on the first node A of the first port is negative with respect to the voltage on the second node B of the first port, and the controller is transitioning from a DIRECT state to a ZERO state where nodes U and V are connected to the B_BUS. In this fourth example of the fifth variant of the first embodiment, the switching of the first P topology switch switches the P topology switch BVP of the fourth switch pair BV. The switching of the second P topology switch switches the P topology switch AVP of the third switch pair AV. The switching of the first N topology switch switches the N topology switch BVN of the fourth switch pair BV. The switching of the second N topology switch switches the N topology switch AVN of the third switch pair AV.

A second exemplary embodiment of the method of control is practiced on a cyclo-converter 7 that is essentially the same as the cyclo-converter 7 discussed above with respect to the first exemplary embodiment.

In the second exemplary embodiment, the method includes switching a first N topology switch to an on state after a magnitude of a current through an output inductor becomes less than a predetermined current threshold (S5 of FIG. 12). Thus, upon entry of the safe commutation mode, the first N topology switch is switched to an on state. The method further includes switching a second N topology switch to an off state a first predetermined time after turning the first N topology switch to the on state (S6 of FIG. 12). These acts are needed for any transition to a direct mode from freewheeling state by clamping to either the A_BUS or the B_BUS.

In a first variant of the second embodiment, the voltage on the first node A of the first port is positive with respect to the voltage on the second node B of the first port, and the controller is transitioning to a DIRECT state from a ZERO state where nodes U and V are clamped to the A_BUS. In this first variant of the second embodiment, the switching of the first N topology switch switches the N topology switch BVN of the fourth switch pair BV, and the switching of the second N topology switch switches the N topology switch AVN of the third switch pair AV.

In a second variant of the second embodiment, the voltage on the first node A of the first port is positive with respect to the voltage on the second node B of the first port, and the controller is transitioning to a DIRECT state from a ZERO state where nodes U and V are clamped to the B_BUS. In this second variant of the second embodiment, the switching of the first N topology switch switches the N topology switch AUN of the First switch pair AU, and the switching of the second N topology switch switches the N topology switch BUN of the second switch pair BU.

In a third variant of the second embodiment, the voltage on the first node A of the first port is negative with respect to the voltage on the second node B of the first port, and the controller is transitioning to a DIRECT state from a ZERO state where nodes U and V are clamped to the A_BUS. In this third variant of the second embodiment, the switching of the first N topology switch switches the N topology switch BUN of the second switch pair BU, and the switching of the second N topology switch switches the N topology switch AUN of the first switch pair AU.

In a fourth variant of the second embodiment, the voltage on the first node A of the first port is negative with respect to the voltage on the second node B of the first port, and the controller is transitioning to a DIRECT state from a ZERO state where nodes U and V are clamped to the B_BUS. In this fourth variant of the second embodiment, the switching of the first N topology switch switches the N topology switch AVN of the third switch pair AV, and the switching of the second N topology switch switches the N topology switch BVN of the fourth switch pair BV.

In a fifth variant of the second embodiment, the method further includes switching a first P topology switch to an on state a second predetermined time after turning the second N topology switch to the off state (S7 of FIG. 12), and switching a second P topology switch to an off state a third predetermined time after turning the first P topology switch to the on state (S8 of FIG. 12). The first, second and third predetermined times need not be equal. However, most commonly, they are equal since they are defined by control signals originating from controller 1.

In a first example of the fifth variant of the second embodiment, the voltage on the first node A of the first port is positive with respect to the voltage on the second node B of the first port, and the controller is transitioning to a DIRECT state from a ZERO state where nodes U and V are clamped to the A_BUS. In this first example of the fifth variant of the second embodiment, the switching of the first N topology switch switches the N topology switch BVN of the fourth switch pair BV. The switching of the second N topology switch switches the N topology switch AVN of the third switch pair AV. The switching of the first P topology switch switches the P topology switch BVP of the fourth switch pair BV. The switching of the second P topology switch switches the P topology switch AVP of the third switch pair AV.

In a second example of the fifth variant of the second embodiment, the voltage on the first node A of the first port is positive with respect to the voltage on the second node B of the first port, and the controller is transitioning to a DIRECT state from a ZERO state where nodes U and V are clamped to the B_BUS. In this second example of the fifth variant of the second embodiment, the switching of the first N topology switch switches the N topology switch AUN of the first switch pair AU. The switching of the second N topology switch switches the N topology switch BUN of the second switch pair BU. The switching of the first P topology switch switches the P topology switch AUP of the first switch pair AU. The switching of the second P topology switch switches the P topology switch BUP of the second switch pair BU.

In a third example of the fifth variant of the second embodiment, the voltage on the first node A of the first port is negative with respect to the voltage on the second node B of the first port, and the controller is transitioning to a DIRECT state from a ZERO state where nodes U and V are clamped to the A_BUS. In this third example of the fifth variant of the second embodiment, the switching of the first N topology switch switches the N topology switch BUN of the second switch pair BU. The switching of the second N topology switch switches die N topology switch AUN of the first switch pair AU. The switching of the first P topology switch switches the P topology switch BUP of the second switch pair BU. The switching of the second P topology switch switches the P topology switch AUP of the first switch pair AU.

In a fourth example of the fifth variant of the second embodiment the voltage on the first node A of the first port is negative with respect to the voltage on the second node B of the first port, and the controller is transitioning to a DIRECT state to a ZERO state where nodes U and V are clamped to the B_BUS. In this fourth example of the fifth variant of the second embodiment, the switching of the first N topology switch switches the N topology switch AVN of the third switch pair AV. The switching of the second N topology switch switches the N topology switch BVN of the fourth switch pair BV. The switching of the first P topology switch switches the P topology switch AVP of the third switch pair AV. The switching of the second P topology switch switches the P topology switch BVP of the fourth switch pair BV.

A third exemplary embodiment of the method of control is practiced on a cyclo-converter 7 that is essentially the same as the cyclo-converter 7 discussed above with respect to the first exemplary embodiment.

In the third exemplary embodiment, the method includes switching a first N topology switch to an on state after a magnitude of a current through an output inductor becomes less than a predetermined current threshold (S5 of FIG. 12). Thus, upon entry of the safe commutation mode, the first N topology switch is switched to an on state. The method further includes switching a second N topology switch to an off state a first predetermined time after turning the first N topology switch to the on state (S6 of FIG. 12). These acts are needed for any transition from an inverted mode to a freewheeling state by clamping to either the A_BUS or the B_BUS.

In a first variant of the third embodiment, the voltage on the first node A of the first port is positive with respect to the voltage on the second node B of the first port, and the controller is transitioning from an inverted state from a ZERO state where nodes U and V are clamped to the A_BUS. In this first variant of the third embodiment, the switching of the first N topology switch switches the N topology switch AUN of the first switch pair AU, and the switching of the second N topology switch switches the N topology switch BUN of the second switch pair BU.

In a second variant of the third embodiment, the voltage on the first node A of the first port is positive with respect to the voltage on the second node B of the first port, and the controller is transitioning from an inverted state from a ZERO state where nodes U and V are clamped to the B_BUS. In this second variant of the third embodiment, the switching of the first N topology switch switches the N topology switch BVN of the fourth switch pair BV, and the switching of the second N topology switch switches the N topology switch AVN of the third switch pair AV.

In a third variant of the third embodiment, the voltage on the first node A of the first port is negative with respect to the voltage on the second node B of the first pot, and the controller is transitioning from an inverted state from a ZERO state where nodes U and V are clamped to the A_BUS. In this third variant of the third embodiment, the switching of the first N topology switch switches the N topology switch AVN of the third switch pair AV, and the switching of the second N topology switch switches the N topology switch BVN of the fourth switch pair BV.

In a fourth variant of the third embodiment, the voltage on the first node A of the first port is negative with respect to the voltage on the second node B of the first port, and the controller is transitioning from an inverted state from a ZERO state where nodes U and V are clamped to the B_BUS. In this fourth variant of the third embodiment, the switching of the first N topology switch switches the N topology switch BUN of the second switch pair BU, and the switching of the second N topology switch switches the N topology switch AUN of the first switch pair AU.

In a fifth variant of the third embodiment, the method further includes switching a first P topology switch to an on state a second predetermined time after turning the second N topology switch to the off state (S7 of FIG. 12), and switching a second P topology switch to an off state a third predetermined time after turning the first P topology switch to the on state (S8 of FIG. 12). The first, second and third predetermined times need not be equal. However, most commonly, they are equal since they are defined by control signals originating from controller 1.

In a first example of the fifth variant of the third embodiments the voltage on the first node A of the first port is positive with respect to the voltage on the second node B of the first port, and the controller is transitioning from an inverted state to a ZERO state where nodes U and V are clamped to the A_BUS. In this first example of the fifth variant of the third embodiment, the switching of the first N topology switch switches the N topology switch AUN of the first switch pair AU. The switching of the second N topology switch switches the N topology switch BUN of the second switch pair BU. The switching of the first P topology switch switches the P topology switch AUP of the first switch pair AU. The switching of the second P topology switch switches the P topology switch BUP of the second switch pair BU.

In a second example of the fifth variant of the third embodiment, the voltage on the first node A of the first port is positive with respect to the voltage on the second node B of the first port, and the controller is transitioning from an inverted state to a ZERO state where nodes U and V are clamped to the B_BUS. In this second example of the fifth variant of the third embodiment, the switching of the first N topology switch switches the N topology switch BVN of the fourth switch pair BV. The switching of the second N topology switch switches the N topology switch AVN of the third switch pair AV. The switching of the first P topology switch switches the P topology switch BVP of the fourth switch pair BV. The switching of the second P topology switch switches the P topology switch AVP of the third switch pair AV.

In a third example of the fifth variant of the third embodiment, the voltage on the first node A of the first port is negative with respect to the voltage on the second node B of the first port, and the controller is transitioning from an inverted state to a ZERO state where nodes U and V are clamped to the A_BUS. In this third example of the fifth variant of the third embodiment, the switching of the first N topology switch switches the N topology switch AVN of the third switch pair AV. The switching of the second N topology switch switches the N topology switch BVN of the fourth switch pair BV. The switching of the first P topology switch switches the P topology switch AVP of the third switch pair AV. The switching of the second P topology switch switches the P topology switch BVP of the fourth switch pair BV.

In a fourth example of the fifth variant of the third embodiment, the voltage on the first node A of the first port is negative with respect to the voltage on the second node B of the first port, and the controller is transitioning from an inverted state to a ZERO state where nodes U and V are clamped to the B_BUS. In this fourth example of the fifth variant of the third embodiment, the switching of the first N topology switch switches the N topology switch BUN of the second switch pair BU. The switching of the second N topology switch switches the N topology switch AUN of the first switch pair AU. The switching of the first P topology switch switches the P topology switch BUP of the second switch pair BU. The switching of the second P topology switch switches the P topology switch AUP of the first switch pair AU.

In an embodiment of a controller according to the invention, the controller is a processor that provides a discrete control signal to each switch element of each switch in the cyclo-converter (8 in all), and also provides a discrete control signal to each switch element of each switch in the HF inverter (4 in all). The processor also includes an input from a current sensor H. Although the processor may be an analog processor, it is typically a digital processor that includes a processor unit, a memory to store program and data, and an input/output structure. The memory may be partitioned into two memories: a read only memory (ROM) or flash memory for storing the program and a static or dynamic random access (data volatile or flash) memory for storing data. The input structure may include an analog to digital converter (for example, a simple and crude dual ramp or any converter on a chip) to convert an analog signal from sensor H into a digital word to be read by the processor. The output structure may include a 12 bit register to hold the 12 bits that define the states of the HF inverter and the cyclo-converter and further includes suitable 12 drivers to drive the control signals to the HF inverter and the cyclo-converter. Alternatively, the circuit that makes up controller 1 may be comprised of a set of drivers plus a microcomputer, an ordinary processor, an application specific integrated circuit (ASIC) or an equivalent circuit made from discrete components. The controller is simply a sequential machine that provides the control signals to turn on and off the 8 active switch elements in the cyclo-converter 7 and the four active switch elements in the HF inverter. The first, second and third predetermined times as discussed above may be simply the periods between the clock pulses that drive the microprocessor. An exemplary embodiment of a method according to the invention is encoded in the computer program that is run in the controller.

In an embodiment of a computer readable media of the invention, the media contains logic modules capable of controlling the processor of the controller. In a general embodiment of media according to the invention that uses a cyclo-converter as discussed above, the media includes a module to control the processor to switch a first switch of the first topology type to an on state after a magnitude of a current through an output inductor becomes less than a predetermined current threshold (S1 of FIG. 11 or S5 of FIG. 12). The media further includes a module to control the processor to switch a second switch of the first topology type to an off state a first predetermined time after switching the first switch of the first topology type to the on state (S2 of FIG. 11 or S6 of FIG. 12). In this embodiment either the first topology type is a P topology and the second topology type is an N topology as depicted in FIG. 11 or the first topology type is an N topology and the second topology type is a P topology as depicted in FIG. 12.

in another general embodiment of media according to the invention that uses a cyclo-converter as discussed above, the media includes a module to control the processor to switch a first switch of the first topology type to an on state after a magnitude of a current through an output inductor becomes less than a predetermined current threshold (S1 of FIG. 11 or S5 of FIG. 12) and further includes a module to control the processor to switch a second switch of the first topology type to an off state a first predetermined time after switching the first switch of the first topology type to the on state (S2 of FIG. 11 or S6 of FIG. 12). The media further includes a module to control the processor to switch a first switch of the second topology type to an on state a second predetermined time after switching the second switch of the first topology type to the off state (S3 of FIG. 11 or S7 of FIG. 12), and the media further includes a module to control the processor to switch a second switch of the second topology type to an off state a third predetermined time after switching the first switch of the second topology type to the on state (S4 of FIG. 11 or S8 of FIG. 12). In this embodiment either the first topology type is a P topology and the second topology type is an N topology as depicted in FIG. 11 or the first topology type is an N topology and the second topology type is a P topology as depicted in FIG. 12.

Having described preferred embodiments of a novel control scheme for a dc/ac cycloconverter (which are intended to be illustrative and not limiting), it is noted that modifications and variations can be made by persons skilled in the art in light of the above teachings. It is therefore to be understood that changes may be made in the particular embodiments of the invention disclosed which are within the scope of the invention as defined by the appended claims.

Having thus described the invention with the details and particularity required by the patent laws, what is claimed and desired protected by Letters Patent is set for in the appended claims.

What is claimed is:

1. In a cyclo-converter that includes a first port having first and second nodes, a second port having first and second nodes, a first switch pair coupled between the first node of the first port and the first node of the second port, a second switch pair coupled between the second node of the first port and the first node of the second port, a third switch pair coupled between the first node of the first port and the second node of the second port, and a fourth switch pair coupled between the second node of the first port and the second node of the second port, each switch pair including a switch of a first topology type and a switch of a second topology type in series connection, a method comprising:
   switching a first switch of the first topology type to an on state after a magnitude of a current through an output inductor becomes less than a predetermined current threshold; and
   switching a second switch of the first topology type to an off state a first predetermined time after switching the first switch of the first topology type to the on state.

2. A method according to claim 1, wherein:
   the voltage on the first node of the first port is positive with respect to the voltage on the second node of the first port;
   the first topology type is a P topology and the second topology type is an N topology;
   the switching of the first switch of the first topology type switches a P topology switch of the third switch pair; and
   the switching of the second switch of the first topology type switches a P topology switch of the fourth switch pair.

3. A method according to claim 1, wherein:
   the voltage on the first node of the first port is positive with respect to the voltage on the second node of the first port;
   the first topology type is a P topology and the second topology type is an N topology;

the switching of the first switch of the first topology type switches a P topology switch of the second switch pair; and the switching of the second switch of the first topology type switches a P topology switch of the first switch pair.

4. A method according to claim 1, wherein:
the voltage on the first node of the first port is negative with respect to the voltage on the second node of the first port;
the first topology type is a P topology and the second topology type is an N topology;
the switching of the first switch of the first topology type switches a P topology switch of the first switch pair; and
the switching of the second switch of the first topology type switches a P topology switch of the second switch par.

5. A method according to claim 1, wherein:
the voltage on the first node of the first port is negative with respect to the voltage on the second node of the first port;
the first topology type is a P topology and the second topology type is an N topology;
the switching of the first switch of the first topology type switches a P topology switch of the fourth switch pair; and
the switching of the second switch of the first topology type switches a P topology switch of the third switch pair.

6. A method according to claim 1 further comprising:
switching a first switch of the second topology type to an on state a second predetermined time after switching the second switch of the first topology type to the off state; and
switching a second switch of the second topology type to an off state a third predetermined time after switching the first switch of the second topology type to the on state.

7. A method according to claim 6, wherein:
the voltage on the first node of the first pot is positive with respect to the voltage on the second node of the first port;
the first topology type is a P topology and the second topology type is an N topology;
the switching of the first switch of the first topology type switches a P topology switch of the third switch pair;
the switching of the second switch of the first topology type switches a P topology switch of the fourth switch pair;
the switching of the first switch of the second topology type switches an N topology switch of the third switch pair; and
the switching of the second switch of the second topology type switches an N topology switch of the fourth switch pair.

8. A method according to claim 6, wherein:
the voltage on the first node of the first port is positive with respect to the voltage on the second node of the first port;
the first topology type is a P topology and the second topology type is an N topology;
the switching of the first switch of the first topology type switches a P topology switch of the second switch pair;
the switching of the second switch of the first topology type switches a P topology switch of the first switch pair;
the switching of the first switch of the second topology type switches an N topology switch of the second switch pair; and
the switching of the second switch of the second topology type switches an N topology switch of the first switch pair.

9. A method according to claim 6, wherein:
the voltage on the first node of the first port is negative with respect to the voltage on the second node of the first port;
the first topology type is a P topology and the second topology type is an N topology;
the switching of the first switch of the first topology type switches a P topology switch of the first switch pair;
the switching of the second switch of the first topology type switches a P topology switch of the second switch pair;
the switching of the first switch of the second topology type switches an N topology switch of the first switch pair; and
the switching of the second switch of the second topology type switches an N topology switch of the second switch pair.

10. A method according to claim 6, wherein:
the voltage on the first node of the first port is negative with respect to the voltage on the second node of the first port;
the first topology type is a P topology and the second topology type is an N topology;
the switching of the first switch of the first topology type switches a P topology switch of the fourth switch pair;
the switching of the second switch of the first topology type switches a P topology switch of the third switch pair;
the switching of the first switch of the second topology type switches an N topology switch of the fourth switch pair; and
the switching of the second switch of the second topology type switches an N topology switch of the third switch pair.

11. A method according to claim 1 wherein the first topology type is an N topology and the second topology type is a P topology.

12. A method according to claim 11, wherein;
the voltage on the first node of the first port is positive with respect to the voltage on the second node of the first port;
the switching of the first switch of the first topology type switches the N topology switch of the fourth switch pair; and
the switching of the second switch of the first topology type switches the N topology switch of the third switch pair.

13. A method according to claim 11, wherein:
the voltage on the first node of the first port is positive with respect to the voltage on the second node of the first port;
the switching of the first switch of the first topology type switches the N topology switch of the first switch pair; and
the switching of the second switch of the first topology type switches the N topology switch of the second switch pair.

14. A method according to claim 11, wherein:
the voltage on the first node of the first port is negative with respect to the voltage on the second node of the first port;
the switching of the first switch of the first topology type switches the N topology switch of the second switch pair and the switching of the second switch of the first topology type switches the N topology switch of the first switch pair.

15. A method according to claim 11, wherein:
the voltage on the first node of the first port is negative with respect to the voltage on the second node of the first port;
the switching of the first switch of the first topology type switches the N topology switch of the third switch pair; and
the switching of the second switch of the first topology type switches the N topology switch of the fourth switch pair.

16. A method according to claim 6, wherein the first topology type is an N topology and the second topology type is a P topology.

17. A method according to claim 16, wherein:
the voltage on the first node of the first port is positive with respect to the voltage on the second node of the first port;
the switching of the first switch of the first topology type switches the N topology switch of the fourth switch pair;
the switching of the second switch of the first topology type switches the N topology switch of the third switch pair;
the switching of the first switch of the second topology type switches the P topology switch of the fourth switch pair; and
the switching of the second switch of the second topology type switches the P topology switch of the third switch pair.

18. A method according to claim 16, wherein:
the voltage on the first node of the first port is positive with respect to the voltage on the second node of the first port;
the switching of the first switch of the first topology type switches the N topology switch of the first switch pair;
the switching of the second switch of the first topology type switches the N topology switch of the second switch pair;
the switching of the first switch of the second topology type switches the P topology switch of the first switch pair; and
the switching of the second switch of the second topology type switches the P topology switch of the second switch pair.

19. A method according to claim 16, wherein:
the voltage on the first node of the first port is negative with respect to the voltage on the second node of the first port;
the switching of the first switch of the first topology type switches the N topology switch of the second switch pair;
the switching of the second switch of the first topology type switches the N topology switch of the first switch pair;
the switching of the first switch of the second topology type switches the P topology switch of the second switch pair; and
the switching of the second switch of the second topology type switches the P topology switch of the first switch pair.

20. A method according to claim 16, wherein:
the voltage on the first node of the first port is negative with respect to the voltage on the second node of the first port;
the switching of the first switch of the first topology type switches the N topology switch of the third switch pair;
the switching of the second switch of the first topology type switches the N topology switch of the fourth switch pair;
the switching of the first switch of the second topology type switches the P topology switch of the third switch pair; and
the switching of the second switch of the second topology type switches the P topology switch of the fourth switch pair.

21. A method according to claim 11, wherein:
the voltage on the first node of the first port is positive with respect to the voltage on the second node of the first port;
the switching of the first switch of the first topology type switches an N topology switch of the first switch pair; and
the switching of the second switch of the first topology type switches an N topology switch of the second switch pair.

22. A method according to claim 11, wherein:
the voltage on the first node of the first port is positive with respect to the voltage on the second node of the first port;
the switching of the first switch of the first topology type an N topology switch of the fourth switch pair, and
the switching of the second switch of the first topology type switches an N topology switch of the third switch pair.

23. A method according to claim 11, wherein:
the voltage on the first node of the first port is negative with respect to the voltage on the second node of the first port;
the switching of the first switch of the first topology type switches an N topology switch of the third switch pair; and
the switching of the second switch of the first topology type switches an N topology switch of the fourth switch pair.

24. A method according to claim 11, wherein:
the voltage on the first node of the first port is negative with respect to the voltage on the second node of the first port;
the switching of the first switch of the first topology type switches an N topology switch of the second switch pair; and
the switching of the second switch of the first topology type switches an N topology switch of the first switch pair.

25. A method according to claim 16, wherein:
the voltage on the first node of the first port is positive with respect to the voltage on the second node of the first port;
the switching of the first switch of the first topology type switches an N topology switch of the first switch pair;
the switching of the second switch of the first topology type switches an N topology switch of the second switch pair;
the switching of the first switch of the second topology type switches a P topology switch of the first switch pair; and
the switching of the second switch of the second topology type switches a P topology switch of the second switch pair.

26. A method according to claim 16, wherein:
the voltage on the first node of the first port is positive with respect to the voltage on the second node of the first port;
the switching of the first switch of the first topology type switches an N topology switch of the fourth switch pair;
the switching of the second switch first topology type switches an N topology switch of the third switch pair;
the switching of the first switch of the second topology type switches a P topology switch of the fourth switch pair; and
the switching of the second switch of the second topology type switches a P topology switch of the third switch pair.

27. A method according to claim 16, wherein:
the voltage on the first node of the first port is negative with respect to the voltage on the second node of the first port;
the switching of the first switch of the fist topology type switches an N topology switch of the third switch pair;
the switching of the second switch of the first topology type switches an N topology switch of the fourth switch pair;
the switching of the first switch of the second topology type switches a P topology switch of the third switch pair; and
the switching of the second switch of the second topology type switches a P topology switch of the fourth switch par.

28. A method according to claim 16, wherein:
the voltage on the first node of the first port is negative with respect to the voltage on the second node of the first port;
the switching of the first switch of the first topology type switches an N topology switch of the second switch pair;
the switching of the second switch of the first topology type switches an N topology switch of the first switch pair;
the switching of the first switch of the second topology type switches a P topology switch of the second switch pair; and
the switching of the second switch of the second topology type switches a P topology switch of the first switch pair.

29. A computer readable medium embodying a computer program product, said program product comprising:
  a cyclo-converter control program, the cyclo-converter control program configured to:
  switch a first switch of a first topology type to an on state after a magnitude of a current through an output inductor becomes less than a predetermined current threshold; and
  switch a second switch of the first topology type to an off state a first predetermined time after switching the first switch of the first topology type to the on state.

30. A computer readable medium according to claim 29, wherein the first topology type is a P topology and the second topology type is an N topology.

31. A computer readable medium according to claim 29, wherein the first topology type is an N topology and the second topology type is a P topology.

32. A computer readable medium according to claim 29, the cyclo-converter control program further configured to:
  switch a first switch of a second topology type to an on state a second predetermined time after switching the second switch of the first topology type to the off state; and
  switch a second switch of the second topology type to an off state a third predetermined time after switching the first switch of the second topology type to the on state.

33. A computer readable medium according to claim 32, wherein the first topology type is a P topology and the second topology type is an N topology.

34. A computer readable medium according to claim 32, wherein the first topology type is an N topology and the second topology type is a P topology.

* * * * *